United States Patent
Badillo et al.

(10) Patent No.: US 9,175,615 B2
(45) Date of Patent: Nov. 3, 2015

(54) METHOD AND SYSTEM FOR ENGINE CONTROL

(71) Applicant: Ford Global Technologies, LLC, Dearborn, MI (US)

(72) Inventors: Ed Badillo, Flat Rock, MI (US); Samuel Guido, Dearborn, MI (US); Ross Dykstra Pursifull, Dearborn, MI (US); Dev Saberwal, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 243 days.

(21) Appl. No.: 13/754,667

(22) Filed: Jan. 30, 2013

(65) Prior Publication Data
US 2014/0214306 A1    Jul. 31, 2014

(51) Int. Cl.
| | |
|---|---|
| *F02B 13/00* | (2006.01) |
| *F02D 19/08* | (2006.01) |
| *F02D 41/14* | (2006.01) |
| *F02P 5/15* | (2006.01) |
| *F02D 37/02* | (2006.01) |

(Continued)

(52) U.S. Cl.
CPC .............. *F02D 19/08* (2013.01); *F02D 19/024* (2013.01); *F02D 19/0647* (2013.01); *F02D 19/081* (2013.01); *F02D 37/02* (2013.01); *F02D 41/0025* (2013.01); *F02D 41/1446* (2013.01); *F02P 5/1502* (2013.01); *F02D 19/0689* (2013.01); *F02D 19/0692* (2013.01); *F02D 19/084* (2013.01); *F02D 41/0027* (2013.01); *F02D 2200/0611* (2013.01); *F02M 25/0727* (2013.01); *Y02T 10/32* (2013.01); *Y02T 10/36* (2013.01); *Y02T 10/46* (2013.01)

(58) Field of Classification Search
CPC ............................ F02D 19/08; F02D 41/1446
USPC ......... 123/575, 304, 305, 578, 676, 672, 704, 123/525, 564, 27 GE, 299, 300, 431, 577, 123/526, 406.44, 406.55; 701/104, 103, 701/105
See application file for complete search history.

(56) References Cited

U.S. PATENT DOCUMENTS

| | | |
|---|---|---|
| 5,117,802 A | 6/1992 | Durbin |
| 5,713,336 A | 2/1998 | King et al. |

(Continued)

FOREIGN PATENT DOCUMENTS

WO    0041905  A1    7/2000

OTHER PUBLICATIONS

The Engineering Toolbox; www.engineeringtoolbox.com, Gases—Explosive and Flammability Concentration Limit. Upper and Lower Flammable Limit of Gasoline; p. 2 or 10. Jun. 8, 2015.*

(Continued)

*Primary Examiner* — Lindsay Low
*Assistant Examiner* — George Jin
(74) *Attorney, Agent, or Firm* — Julia Voutyras; Alleman Hall McCoy Russell & Tuttle LLP (57) ABSTRACT

Methods and systems are provided for reducing exhaust temperatures during high engine load conditions in engine systems configured to operate with multiple fuels. Stoichiometric cylinder operation is provided via injection of a gaseous fuel such as CNG. In response to elevated exhaust temperatures, the cylinder is enriched by injecting a liquid fuel, such as gasoline, while maintaining the injection of CNG and while maintaining spark timing at MBT.

19 Claims, 5 Drawing Sheets

(51) Int. Cl.
*F02D 41/00* (2006.01)
*F02D 19/02* (2006.01)
*F02D 19/06* (2006.01)
*F02M 25/07* (2006.01)

(56) References Cited

U.S. PATENT DOCUMENTS

| | | | |
|---|---|---|---|
| 5,765,526 A * | 6/1998 | Hara | 123/333 |
| 6,145,494 A | 11/2000 | Klopp | |
| 6,422,008 B2 | 7/2002 | Voss et al. | |
| 6,687,597 B2 * | 2/2004 | Sulatisky et al. | 701/104 |
| 7,287,509 B1 * | 10/2007 | Brehob | 123/299 |
| 7,412,966 B2 * | 8/2008 | Lewis et al. | 123/431 |
| 7,703,435 B2 | 4/2010 | Surnilla et al. | |
| 7,918,207 B2 | 4/2011 | Pursifull et al. | |
| 2004/0139944 A1 | 7/2004 | Nakano et al. | |
| 2008/0035106 A1 * | 2/2008 | Stein | 123/304 |
| 2009/0071452 A1 * | 3/2009 | Phlips et al. | 123/575 |
| 2010/0242935 A1 * | 9/2010 | Takubo | 123/703 |
| 2010/0318277 A1 * | 12/2010 | Pursifull et al. | 701/103 |
| 2010/0318284 A1 * | 12/2010 | Surnilla et al. | 701/113 |
| 2011/0023482 A1 | 2/2011 | Styles et al. | |
| 2011/0061622 A1 | 3/2011 | Lund | |
| 2011/0114058 A1 * | 5/2011 | Cohn et al. | 123/25 A |
| 2011/0132284 A1 * | 6/2011 | Leone et al. | 123/3 |
| 2011/0139136 A1 * | 6/2011 | Guo et al. | 123/676 |
| 2011/0174267 A1 * | 7/2011 | Surnilla et al. | 123/406.29 |
| 2011/0184629 A1 * | 7/2011 | Krengel et al. | 701/103 |
| 2011/0239988 A1 * | 10/2011 | Reiche et al. | 123/406.76 |
| 2012/0245827 A1 * | 9/2012 | Glugla et al. | 701/105 |

OTHER PUBLICATIONS

Badillo, E. et al., "Method and System for Engine Control," U.S. Appl. No. 13/841,611, filed Mar. 15, 2013, 38 pages.

* cited by examiner

| Example | Air | Fuel(s) | Throttle |
|---|---|---|---|
| I | | | Maintain |
| II | | | Maintain |
| III | | | Maintain |
| IV | | | Reduce |

*Co-fueling approach* ← 500

| Speed/Load range | Gasoline | CNG | 1/lambda | Torque ratio | Tq relative to gasoline |
|---|---|---|---|---|---|
| Low speed (1000 to 1500rpm) High load | 0% | 100% | 1.00 | 1.00 | 120% |
| Med. speed (1500 to 3000rpm) High load | 0% | 100% | 1.00 | 1.00 | 95% |
| Torque band (3000 to 4500rpm) High load | 70% | 30% | 1.30 | 1.00 | 110% |
| Power band (4500 to 6000rpm) High load | 15% | 85% | 1.10 | 1.00 | 100% |
| Power band (4500 to 6000rpm) High load, Cat. Protect | 15% | 85% | 0.70 | 1.00 | 90% |

*Conventional gasoline approach* ← 510

| Speed/Load range | Gasoline | CNG | 1/lambda | Torque ratio | Tq relative to gasoline |
|---|---|---|---|---|---|
| Low speed (1000 to 1500rpm) High load | 100% | 0% | 1.00 | 0.80 | 100% |
| Med. speed (1500 to 3000rpm) High load | 100% | 0% | 1.00 | 1.00 | 100% |
| Torque band (3000 to 4500rpm) High load | 100% | 0% | 1.30 | 0.80 | 100% |
| Power band (4500 to 6000rpm) High load | 100% | 0% | 1.30 | 0.80 | 100% |
| Power band (4500 to 6000rpm) High load, Cat. Protect | 100% | 0% | 1.30 | 0.80 | 100% |

*Conventional CNG approach* ← 520

| Speed/Load range | Gasoline | CNG | 1/lambda | Torque ratio | Tq relative to gasoline |
|---|---|---|---|---|---|
| Low speed (1000 to 1500rpm) High load | 0% | 100% | 1.00 | 1.00 | 120% |
| Med. speed (1500 to 3000rpm) High load | 0% | 100% | 1.00 | 1.00 | 95% |
| Torque band (3000 to 4500rpm) High load | 0% | 100% | 1.10 | 1.00 | 75% |
| Power band (4500 to 6000rpm) High load | 0% | 100% | 1.10 | 1.00 | 90% |
| Power band (4500 to 6000rpm) High load, Cat. Protect | 0% | 100% | 0.70 | 1.00 | 70% |

FIG. 5

METHOD AND SYSTEM FOR ENGINE CONTROL

FIELD

The present application relates to adjusting engine operation in a bi-fuel vehicle using compressed natural gas.

BACKGROUND/SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. Various engine systems may be used with CNG fuels, utilizing various engine technologies and injection technologies that are adapted to the specific physical and chemical properties of CNG fuels. For example, mono-fuel engine systems may be configured to operate only with CNG while multi-fuel systems may be configured to operate with CNG and one or more other fuels, such as gasoline or gasoline blend liquid fuels. Engine control systems may operate such multi-fuels systems in various operating modes based on engine operating conditions.

One example multi-fuel system is described by Surnilla et al. in U.S. Pat. No. 7,703,435. Therein, an engine is configured to operate on CNG, gasoline, or a mixture of both. Fuel is selected for operating the engine during particular operating conditions based on the amount of fuel available in each fuel storage tank as well as based on the type and attributes of the available fuel. For example, vehicle mileage can be extended by selecting a particular fuel during high driver demand. As another example, engine emissions can be improved by reserving a particular fuel for engine starting conditions.

However the inventors herein have recognized that the approach of '435 may not leverage all the attributes of the available fuels. For example, the approach does not take into consideration the flammability limits of the available fuels. Since the flammability limits of each fuel have an effect on the fuel's octane, torque output, and knock addressing ability, the fuel injection profiles selected may have torque loss issues, knock resistance issues, and/or may require the use of substantial spark retard. As such, any of these may result in reduced fuel economy.

In one example, some of the above issues may be addressed by an engine method that leverages all the attributes of the available fuels, including the flammability limits. The method comprises, during high load conditions, when operating with a first gaseous fuel, in response to an elevated exhaust temperature, enriching the engine via injection of a second, liquid fuel while maintaining spark timing.

As an example, an engine may be configured to operate on a first, gaseous fuel, such as CNG, and a second, liquid fuel, such as gasoline. During high load conditions, the engine may be operating on at least some CNG to provide benefits that minimize the consumption of liquid fuel while meeting the torque demand. In other words, the system may be configured to preferentially use the low cost, high octane gaseous fuel. For example, CNG may be port injected into an engine cylinder, the port injection based on the intake air received in the cylinder so as to operate the cylinder with a combustion air-fuel ratio that is substantially at or around stoichiometry. In response to elevated exhaust temperatures experienced while operating at high engine loads, exhaust cooling may be achieved by enriching the engine cylinder via increased injection of the liquid fuel. For example, as the exhaust temperature increases above a threshold temperature, gasoline may be direct injected into the cylinder to provide a combustion air-fuel ratio that is richer than stoichiometry. At the same time, injection of CNG may be maintained while also maintaining spark timing at MBT. For example, while operating the cylinder with 100% CNG (that is, fueling with CNG corresponding to 100% of the intake air amount) to meet the torque demand, the cylinder may be enriched using up to 15% gasoline (that is, fueling with additional gasoline corresponding to 15% of the intake air amount). While the example is referenced as 100% CNG and 15% gasoline, the same may also be alternatively represented as a fuel split of 87% CNG and 13% gasoline at 15% overall richness.

This approach provides various benefits. First, the octane of CNG can be used to meet the torque demand without need for spark retard while the wider flammability limit of gasoline (e.g., in the range of 0.6 to 1.5 lambda) is advantageously used to cool the exhaust. By using CNG to power the engine and gasoline to cool the engine, a smaller degree of enrichment is needed to cool the engine than would have otherwise been required if the engine were operating with only gasoline. As such, this improves fuel economy. By reducing the need for spark retard (which would have otherwise been required if the engine were operating with only gasoline), torque losses and power losses are reduced. By also reducing the need for throttle adjustments (which would have otherwise been required to reduce the exhaust temperature), torque losses due to lower intake air charge are also reduced. Overall, exhaust cooling is achieved without suffering power losses and without degrading fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
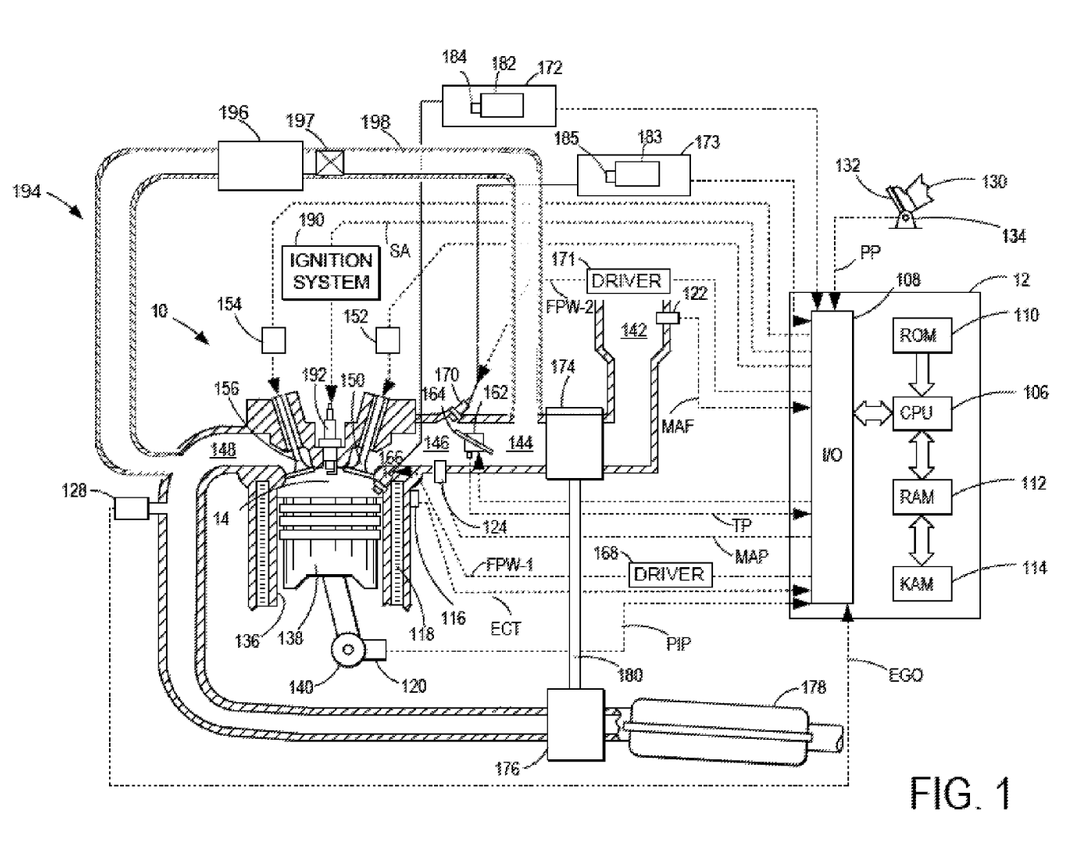
FIG. 1 shows a schematic depiction of a multi-fuel engine system configured to operate with a liquid fuel and a gaseous fuel.

Methods and systems are provided for cooling exhaust in a multi-fuel engine system, such as the system of FIG. 1. A controller may be configured to enrich an engine cylinder operating with a first gaseous fuel at high engine loads by increasing injection of a second liquid fuel to reduce exhaust temperatures. For example, the controller may perform a control routine, such as described in FIG. 2, to increase gasoline injection to a cylinder already operating with CNG, while maintaining spark timing, to cool engine exhaust at high engine loads. Example adjustments in a multi-fuel system are described herein with reference to FIGS. 3-4. The torque and cooling benefits achieved via the use of co-fueling are elaborated at FIG. 5. In this way, elevated exhaust temperatures may be addressed without reducing engine output.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof. Engine 10 may include an exhaust gas recirculation (EGR) system indicated generally at 194. EGR system 194 may include an EGR cooler 196 disposed along the EGR conduit 198. Further, the EGR system may include an EGR valve 197 disposed along EGR conduit 198 to regulate the amount of exhaust gas recirculated to the intake manifold 144.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing timing and/or lift amount of the respective intake and exhaust valves. The position of intake valve 150 and exhaust valve 156 may be determined by respective valve position sensors (not shown). The valve actuators may include electric valve actuation or cam actuation, or a combination thereof. In the example of cam actuation, each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to a spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Fuel may be delivered to fuel injector 166 from first fuel system 172, which may be a liquid (e.g., gasoline, ethanol, or combinations thereof) fuel system, including a fuel tank, fuel pumps, and a fuel rail. In one example as shown in FIG. 1, fuel system 172 may include a fuel tank 182 and a fuel sensor 184, for example a liquid level sensor, to detect the storage amount in the fuel tank 182. Alternatively, fuel may be delivered by a single stage fuel pump at lower pressure, in which case the timing of the direct fuel injection may be more limited during the compression stroke than if a high pressure fuel system is used.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by a second fuel system 173, which may be a high pressure fuel system, including a fuel tank, a fuel pump, and a fuel rail. In one example as shown in FIG. 1, the fuel system 173 may include a pressurized gas fuel tank 183, and a fuel pressure sensor 185 to detect the fuel pressure in the fuel tank 183. Note that a single driver 168 or 171 may be used for both fuel injection systems, or multiple drivers, for example driver 168 for fuel injector 166 and driver 171 for fuel injector 170, may be used, as depicted. The fuel system 173 may be a gaseous fuel system. For example, the gaseous fuels may include CNG, hydrogen, LPG, LNG, etc. or combinations thereof. It will be appreciated that gaseous fuels, as referred to herein, are fuels that are gaseous at atmospheric conditions but may be in liquid form while at high pressure (specifically, above saturation pressure) in the fuel system. In comparison, liquid fuels, as referred to herein, are fuels that are liquid at atmospheric conditions.

It will be appreciated that while the depicted embodiment is configured to deliver one fuel via direct injection and another fuel via port injection, in still further embodiments, the engine system may include multiple port injectors wherein each of the gaseous fuel and the liquid fuel is delivered to a cylinder via port injection. Likewise, in other embodiments, the engine system may include multiple direct injectors wherein each of the gaseous fuel and the liquid fuel is delivered to a cylinder via direct injection.

The delivery of the different fuels may be referred to as a fuel type, such that the fuel type may be varied by injection relatively more or less of the liquid fuel compared with the gaseous fuel, or vice versa.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 124; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 120, which is also used as an engine speed sensor, may produce a predetermined number of equally spaced pulses every revolution of the crankshaft.

As described above, FIG. 1 shows only one cylinder of a multi-cylinder engine. As such, each cylinder may similarly include its own set of intake/exhaust valves, fuel injector(s), spark plug, etc.

Figure 2:
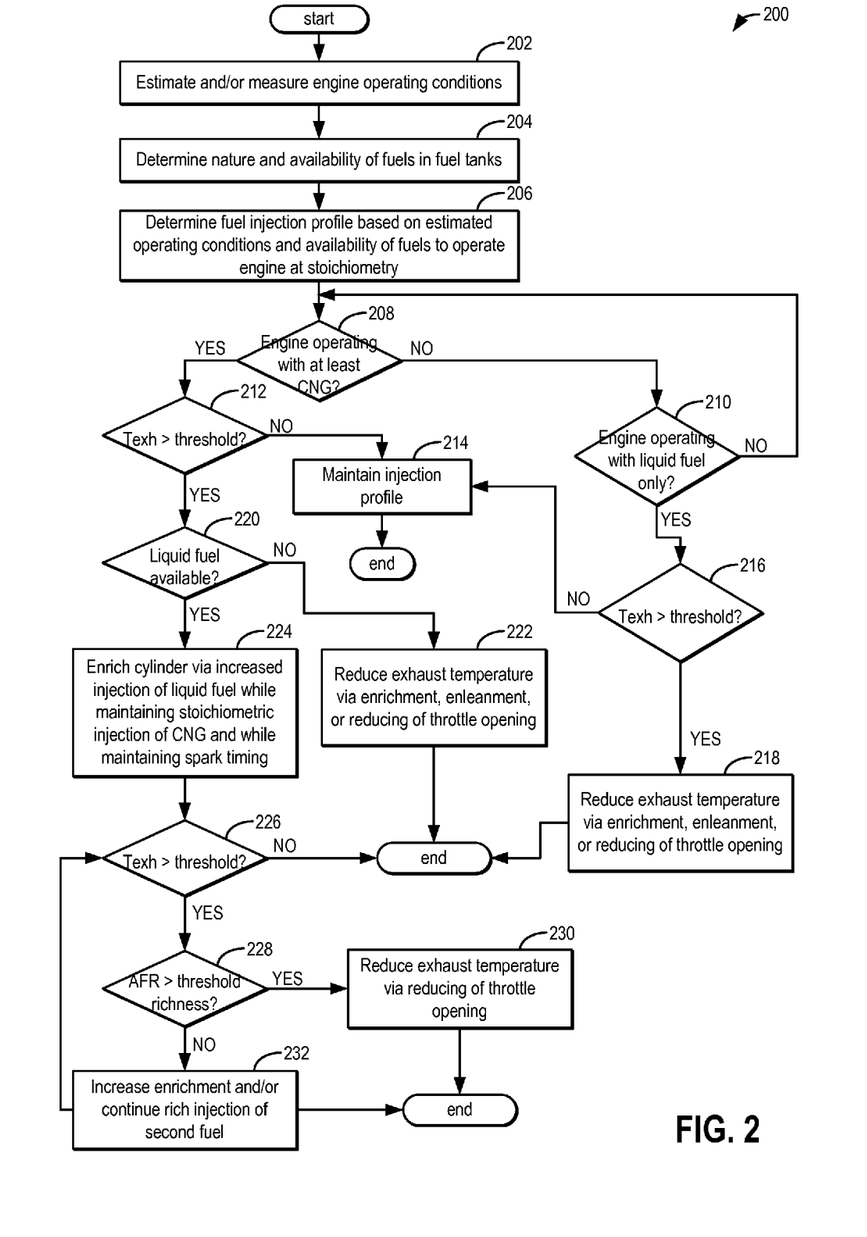
FIG. 2 shows an example flowchart for adjusting a fuel injection profile in a multi-fuel engine system responsive to elevated exhaust temperatures.

As elaborated herein with reference to FIG. 2, an engine controller may inject one or more of a first, gaseous fuel such as CNG to the engine cylinder (e.g., via port injector 170) and a second, liquid fuel such as gasoline to the engine cylinder (e.g., via direct injector 166) to meet engine torque demands. Further, during conditions when engine exhaust temperatures (or combustion chamber temperatures) are elevated, such as during high engine load conditions, cylinder cooling may be achieved by enriching the cylinder with increased injection of the liquid fuel. Specifically, gaseous fuel injection (e.g., 100% CNG, wherein the fueling of CNG into the cylinder corresponds to 100% of the cylinder intake air amount) may be used to meet the engine power demand while liquid fuel injection (e.g., 0-15% gasoline, wherein the fueling of gasoline into the cylinder corresponds to 0-15% of the cylinder intake air amount) is used to cool the cylinder. This allows exhaust cooling to be achieved without necessitating throttle or spark timing adjustments, and without compromising engine power. By using the gaseous fuel to meet the torque demand, the flammability limit of the liquid fuel can be widened (e.g., to 0.6-1.5 lambda), allowing for a larger degree of enrichment to be tolerated before combustion stability issues arise. This counter-intuitive effect is due to the ability to maintain spark substantially at MBT due to the higher octane of the gaseous fuel. The combustion stability "negative" of extreme spark retard associated with gasoline-only operation is thereby eliminated when the air's base fuel need is covered by the gaseous fuel. Further, the combination leverages the attributes of both fuels enabling exhaust cooling to be achieved with a much smaller amount of enrichment than would have been required if any one fuel were used. Example fuel injection profiles used during exhaust cooling are elaborated herein with reference to FIGS. 3-4.

In this way, the system of FIG. 1 enables a method of operating an engine wherein during high load conditions, when operating with a first gaseous fuel, in response to an elevated exhaust temperature, the engine is enriched via injection of a second, liquid fuel while maintaining substantially MBT spark timing. For example, by using CNG to operate the cylinder at stoichiometry while using gasoline to enrich the cylinder, engine torque demands can be met by combusting the CNG while the gasoline injection is used to cool the exhaust.

Now turning to FIG. 2, an example routine 200 is shown for adjusting a fuel injection profile in a multi-fuel engine system (such as the engine system of FIG. 1) so as to reduce exhaust temperatures without degrading engine performance, in particular during high engine load conditions.

At 202, the routine includes estimating and/or measuring engine operating conditions. These may include, for example, engine speed, engine temperature, exhaust catalyst temperature, boost level, MAP, MAF, etc. At 204, the nature and availability of fuels in the fuel tanks of the multi-fuel engine system may be determined. For example, output of fuel tank fuel level sensors may be used to estimate the availability of fuel in each fuel tank. As another example, it may be determined whether the gaseous fuel available is CNG, LPG, hydrogen, etc. As yet another example, the alcohol content of the liquid fuel may be estimated so as to determine the composition of the liquid fuel available (e.g., whether the liquid fuel is E10, E50, E85, M85, etc.).

At 206, based on the estimated engine operating conditions and the determined availability of fuels in the engine's fuel systems, a fuel injection profile may be determined. Specifically, the fuel injection profile may include an amount of a first, gaseous fuel (such as CNG) and/or an amount of a second, liquid fuel (such as gasoline) that is injected into an engine cylinder so as to operate the cylinder at stoichiometry. In one example, the engine may be operated with injection of only the first, gaseous fuel, wherein an amount of the first fuel injected into the engine cylinder is adjusted based on intake air received in the cylinder so as to operate the engine with a stoichiometric combustion air-fuel ratio. Herein, the first gaseous fuel may be delivered to the cylinder as a port injection. In another example, the engine may be operated with injection of only the second, liquid fuel, wherein an amount of the second fuel injected into the engine cylinder is adjusted based on intake air received in the cylinder so as to operate the engine with a stoichiometric combustion air-fuel ratio. Herein, the second liquid fuel may be delivered to the cylinder as a direct injection. In still another example, the engine cylinder may be co-fueled with at least some of the first gaseous fuel and at least some of the second liquid fuel injected into the cylinder with the amounts of the first and second fuel adjusted based on intake air received in the cylinder so as to operate the engine with a stoichiometric combustion air-fuel ratio. Herein, the first gaseous fuel may be delivered to the cylinder as a port injection while the second liquid fuel is delivered as a direct injection.

At 208, it may be determined if the engine is operating with at least some CNG. For example, it may be determined if the stoichiometric engine operation is provided via injection of only CNG, or at least some CNG. If the engine is operating with at least CNG, then at 212, it may be determined if elevated exhaust temperature conditions exist. In one example, when operating at high engine loads, exhaust temperatures may become high leading to an increased propensity for abnormal combustion events such as knocking, misfire, or engine materials damage. If the exhaust temperature (Texh) is not higher than a threshold temperature, then at 214, the injection profile determined at 206 may be maintained.

If the exhaust temperature is higher than the threshold temperature, then at 220, it may be determined if the second liquid fuel is available for addressing the elevated exhaust temperature. If yes, then at 224, when operating with the first gaseous fuel, in response to the elevated exhaust temperature (e.g., during high load conditions), the routine includes enriching the engine via injection of the second, liquid fuel while maintaining spark timing. Specifically, an amount of first fuel injected into the cylinder may be previously determined based on intake air in the cylinder so as to operate the engine with a stoichiometric combustion air-fuel ratio. Then, while maintaining operation with the first gaseous fuel, an amount of second, liquid fuel injected into the cylinder may be increased to operate the cylinder with an overall rich combustion air-fuel ratio. In addition, spark timing may be maintained at substantially MBT. For example, spark timing may be maintained at peak torque timing.

It will be appreciated that in alternate examples, maintaining spark timing includes maintaining spark timing at a timing other than MBT. That is, an amount of spark retard or spark advance applied may be maintained. For example, there may be conditions where, even with unlimited octane, spark advance is limited not based on cylinder knock, but based on combustion pressure rise rate. In those examples, the engine may be at an operating point where spark is retarded from MBT based on pressure rise rate considerations. Therein, the spark retard setting may be maintained while the injection of the first gaseous fuel and the second liquid fuel is adjusted.

Herein, the amount of second fuel is adjusted based on the elevated exhaust temperature. The adjusting may include adjusting the amount of second fuel based on a difference between the elevated exhaust temperature and a threshold temperature. For example, as a difference between the exhaust temperature (measured or inferred) and the threshold temperature increases, the amount of second fuel injected into the cylinder may be increased while the amount of first fuel injected into the cylinder is maintained. In other words, more of the liquid second fuel is additionally injected into the cylinder at higher exhaust temperatures and less of the liquid second fuel is additionally injected into the cylinder at lower exhaust temperatures, all the while maintaining injection of the first gaseous fuel. It will be appreciated that the amount of first, gaseous fuel is not adjusted responsive to the elevated exhaust temperature and that only the amount of second, liquid fuel is adjusted responsive to the elevated exhaust temperature. It will also be appreciated that all the while that the second fuel is injected to enrich the cylinder and cool the exhaust, injection of the first, gaseous fuel is maintained at a stoichiometric relation with respect to fresh intake air in the cylinder. In one example, the fuel injection profile may include 100% CNG and up to 15% gasoline for cooling the exhaust. Herein, the gasoline is used to widen the flammability limits while the CNG is used to erase the knock limits. Not only does usage of both fuels improve combustion stability limits (by widening the flammability limits), but also, the power gain achieved via use of the combination of fuels is higher than the power gain achievable with use of either fuel alone. In this way, exhaust cooling is achieved without incurring torque loss.

As such, operating the cylinder with 100% CNG and 15% gasoline implied fueling the cylinder with CNG corresponding to 100% of the intake air amount to meet the torque demand, while enriching the cylinder with additional gasoline corresponding to 15% of the intake air amount. It will be appreciated that the example referenced as 100% CNG and 15% gasoline may alternatively be expressed as a fuel split of 87% CNG and 13% gasoline at 15% overall richness.

In an alternate example, the fuel injection profile may include 60% CNG and up to 10% gasoline (that is, fueling the cylinder with CNG corresponding to 60% of the intake air amount and fueling the cylinder with gasoline corresponding to 15% of the intake air) for cooling the exhaust. Here too the gasoline is used to widen the flammability limits while the CNG is used to erase the knock limits. However, due to reduced fuel usage in this example, some torque loss may be incurred.

As such, historically in the CNG industry, gasoline operation is known as the "best power/best torque" mode. The described fueling algorithm delivers an increase in power at a significant fuel economy enhancement over the gasoline only mode. In other words, this innovative form of co-fueling that recognizes the flammability limit effect gets better maximum power and better maximum torque at a better brake specific fuel consumption than gasoline alone.

It will be appreciated that in certain situations, where maximum power or maximum torque is not required, the controller may operate the engine lean for exhaust temperature reduction, fuel economy, or NOx emission reduction. In those situations, the use of gasoline can extend the lean flammability limit over that of gasoline alone.

In some embodiments, the amount of second fuel injected may be further based on an alcohol content of the second fuel. As such, alcohol and alcohol solutions have a greater cylinder and exhaust cooling effect than gasoline at equivalent energy content. Thus for any given target lambda (lambda being defined as AFR actual/AFR stoich.), less alcohol fuel is required than gasoline to achieve equivalent cooling. The amount of second fuel injected may be further based on the flammability limit of the second fuel. As such, if a fuel's lean flammability exceeds that of gasoline, the overall mixture could be run even more lean, thus delivering more of the aforementioned lean benefits.

Maintaining operation with the first fuel while increasing an amount of second fuel injected into the cylinder may include port injecting the first fuel while direct injecting the second fuel into the cylinder. The mixture of the second fuel and the first fuel may then be combusted in the cylinder via spark ignition.

As such, if liquid fuel is not available at 220, the routine may proceed to 222 wherein exhaust temperature is limited via the use of only the first gaseous fuel. This may be achieved by adjusting the injection amount of the first fuel (relative to the intake charge) so as to enrich or enlean the cylinder. As an example, where the first fuel is CNG, exhaust temperature may be limited by going 10% richer than stoichiometry, or 20% leaner than stoichiometry. The enrichment may provide some cooling with limited torque loss. The enleanment may provide relatively more cooling at greater torque loss. In an alternate example, exhaust temperature may be reduced by throttling back. Herein, the reduction in opening of the intake throttle reduces intake air received in the cylinder, enabling cooling. However, a greater torque loss is incurred.

Returning to 224, after combusting the mixture of the second fuel and the first fuel in the cylinder, at 226, it may be determined if the exhaust temperature has been controlled. Specifically, it may be determined if the exhaust temperature (Texh) is still above the threshold temperature. If not, the routine may end and cylinder fueling based on engine operating conditions may resume. If, however, the exhaust temperature (Texh) is still elevated (e.g., above the threshold temperature), then at 228, it may be determined if the cylinder combustion ratio has reached a threshold rich air-fuel ratio.

At 232, if the cylinder combustion ratio has not reached the threshold rich air-fuel ratio, the amount of second fuel injected into the cylinder may be increased responsive to the elevated exhaust temperature. As such, in response to elevated exhaust temperatures, the controller may continue enriching the cylinder to cool the exhaust with increased injection of the second, liquid fuel until a threshold rich combustion air-fuel ratio is reached. This threshold air-fuel ratio may be based on combustion stability limits and as such, may be influenced by the flammability limit of the liquid fuel being used.

In comparison, at 230, in response to the exhaust temperature still being above the threshold temperature even after reaching the threshold rich combustion air-fuel ratio, the routine includes using alternate approaches to limit exhaust temperature. Specifically, the routine includes decreasing opening of an intake throttle while maintaining the amount of first fuel injected (to maintain the stoichiometric relation between the first fuel and the cylinder intake aircharge) and while maintaining the amount of second fuel (to maintain the richer than stoichiometry relation between the second fuel and the cylinder intake aircharge). By reducing intake throttle opening, an amount of intake air received in the cylinder may be reduced, and exhaust over-heating may be addressed, albeit with a corresponding drop in engine power output.

Returning to 208, if the engine is not operating with at least CNG, at 210, it may be confirmed that the engine is operating with a liquid fuel only. For example, it may be confirmed that the engine is operating with a fuel injection profile including injection of only gasoline or injection of only a gasoline-alcohol fuel blend. Next, at 216, as at 212, it may be determined if the exhaust temperature (Texh) is higher than the threshold temperature. If not, then the routine returns to 214 to maintain the injection profile. Else, if exhaust over-temperature conditions exist, then at 218, the routine limits exhaust temperature via the use of only the second liquid fuel. This may be achieved by adjusting the injection amount of the second fuel (relative to the intake charge) so as to enrich or enlean the cylinder. As an example, where the second fuel is gasoline, exhaust temperature may be limited by going 40% richer than stoichiometry, 30% leaner than stoichiometry, or via the use of substantial spark retard. The enrichment or the spark retard may provide some cooling but with substantial torque loss. The enleanment may also provide cooling but again with a corresponding torque loss. In an alternate example, exhaust temperature may be reduced by throttling back. Herein, the reduction in opening of the throttle reduces intake air received in the cylinder, enabling cooling. However, a greater torque loss is incurred.

A detailed comparison of the torque ratio, equivalence ratio, and torque benefits achieved through the use of a co-fueling approach (wherein a cylinder is fueled with each of gasoline and CNG) relative to conventional CNG only or gasoline only fueling approaches is elaborated below at FIG. 5.

Figure 3:
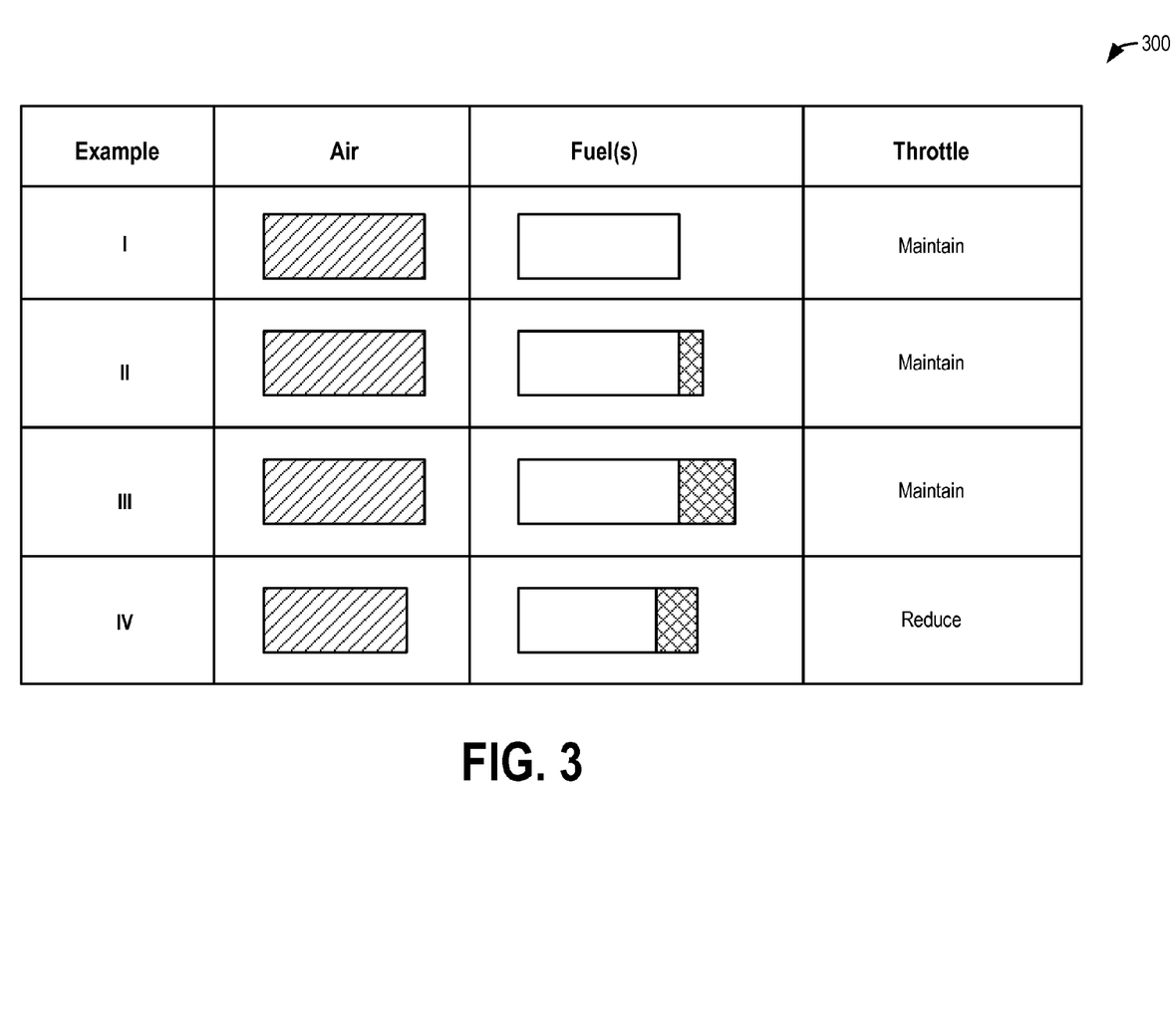
FIGS. 3-4 show example adjustments to a fuel injection profile of a first, liquid fuel and a second, gaseous fuel in response to elevated exhaust temperatures at high engine loads.

Now turning to FIG. 3, map 300 shows example air-fuel mixtures using one or more of the first, gaseous fuel and the second, liquid fuel that are combusted in a cylinder. Map 300 also depicts intake throttle adjustments that may be concomitantly used with the various combustion mixtures to reduce exhaust temperatures at high engine load conditions. In particular, example distributions of fuel in a cylinder combustion mixture, between a first amount of the first, gaseous fuel (such as CNG), and a second amount of the second liquid fuel (such as gasoline), for a given amount of intake air, are shown. In all the depicted examples, the different distributions are used to enable cylinder cooling and reduce the amount of heat delivered to the exhaust.

For each cylinder combustion mixture, a cylinder intake air amount may be determined (represented herein by corresponding hatched bars). The intake air amount for the cylinder combustion mixture may be based on engine operating conditions including for example, boost settings of the turbocharger, and intake and exhaust valve settings (e.g., valve opening, valve closing, duration of valve opening, duration of valve overlap, etc.). An amount of fuel correspondingly used in the cylinder combustion mixture is then adjusted based on the exhaust temperature. Usage of the first, gaseous fuel in the cylinder combustion mixture is depicted by a solid, white bar while usage of the second, liquid fuel in the cylinder combustion mixture is depicted by a cross hatched bar. In the depicted examples, the first fuel is CNG and the second fuel is gasoline. It will be appreciated that in the following examples, a 1:1 usage of fuel and air in the cylinder is used to depict a substantially stoichiometric combustion mixture. Any additional fuel included in the mixture over the 1:1 (lambda) ratio is used to depict a combustion mixture that is richer than stoichiometry, with the richness increasing as the amount of additional fuel increases. As used herein, the fuel amount being proportional to the air amount does not imply a 1:1 air:fuel ratio. Rather, it implies a ratio required to generate a stoichiometric mixture (e.g., 14.6:1 air:fuel for gasoline). However, in alternate examples, the air:fuel ratio may be different (e.g., a 1:1 ratio) based on the desired air-to-fuel ratio of each mixture.

Example I depicts a first fuel injection profile that may be used during low to medium engine load conditions, while exhaust temperatures are below a threshold temperature. Herein, a first injection amount of the first fuel (solid bar) is adjusted to be proportional to the cylinder intake air amount (hatched bar) so that a substantially stoichiometric cylinder combustion mixture is generated. In the depicted example, only the first fuel is injected and no injection of the second fuel is required to meet the engine torque demand. Further, since the exhaust temperature is within the threshold temperature, additional throttle adjustments are not required and an intake throttle position may be maintained.

Example II depicts a second fuel injection profile that may be used during high engine load conditions in response to exhaust temperatures being above a threshold temperature. Herein, the first injection amount of the first fuel (solid bar) is maintained at being proportional to the cylinder intake air amount (hatched bar) so that a substantially stoichiometric cylinder combustion mixture is generated by the air and the first fuel. Then, cylinder enrichment is provided by the injection of the second amount of the second fuel (cross hatched bar). In particular, an amount of second fuel is added that is based on the difference between the elevated exhaust temperature and the threshold temperature so as to generate a combustion mixture in the cylinder that is richer than stoichiometry. Herein, the liquid fuel added to the cylinder provides a cooling effect that reduces exhaust heat. In addition, MBT spark timing is maintained, while also maintaining throttle position. This reduces the exhaust heat that would have resulted from the use of spark retard. Thus, in the depicted example, the first fuel is injected to meet the engine torque demand while the second fuel is injected to cool the exhaust. By using injection of the second fuel to provide cooling, the exhaust temperature can be brought within the threshold temperature without requiring additional intake throttle adjustments.

Example III depicts a third fuel injection profile that may also be used during high engine load conditions in response to exhaust temperatures being above a threshold temperature. Herein, the first injection amount of the first fuel (solid bar) is maintained at being proportional to the cylinder intake air amount (hatched bar) so that a substantially stoichiometric cylinder combustion mixture is generated by the air and the first fuel. Then, cylinder enrichment is provided by the injection of the second amount of the second fuel (cross hatched bar). In particular, a larger amount of second fuel is added (as compared to the amount of second fuel added in Example II) responsive to a larger difference between the elevated exhaust temperature and the threshold temperature as compared to the difference in Example II. Consequently, the combustion mixture generated in the cylinder in Example III has a higher degree of richness than the combustion mixture generated in the cylinder in Example II. By using injection of the second fuel to provide cooling, the exhaust temperature can be brought within the threshold temperature without requiring additional intake throttle adjustments.

Example IV depicts a fourth fuel injection profile that may also be used during high engine load conditions in response to exhaust temperatures being above a threshold temperature. In the present example, even with the addition of second fuel, exhaust temperatures may remain elevated. Also, further addition of second fuel may not be possible due to combustion stability limits. Specifically, the amount of second fuel added may be a threshold amount causing the cylinder combustion air-fuel ratio to be at an upper threshold of richness. Further enrichment may cause combustion stability issues. Thus, to address elevated exhaust temperature issues existing even after the addition of the threshold amount of second fuel, and even after reaching the threshold rich combustion air-fuel ratio, throttle adjustments may be used to cool the exhaust. In particular, intake throttle opening may be reduced to cool the exhaust.

Figure 4:
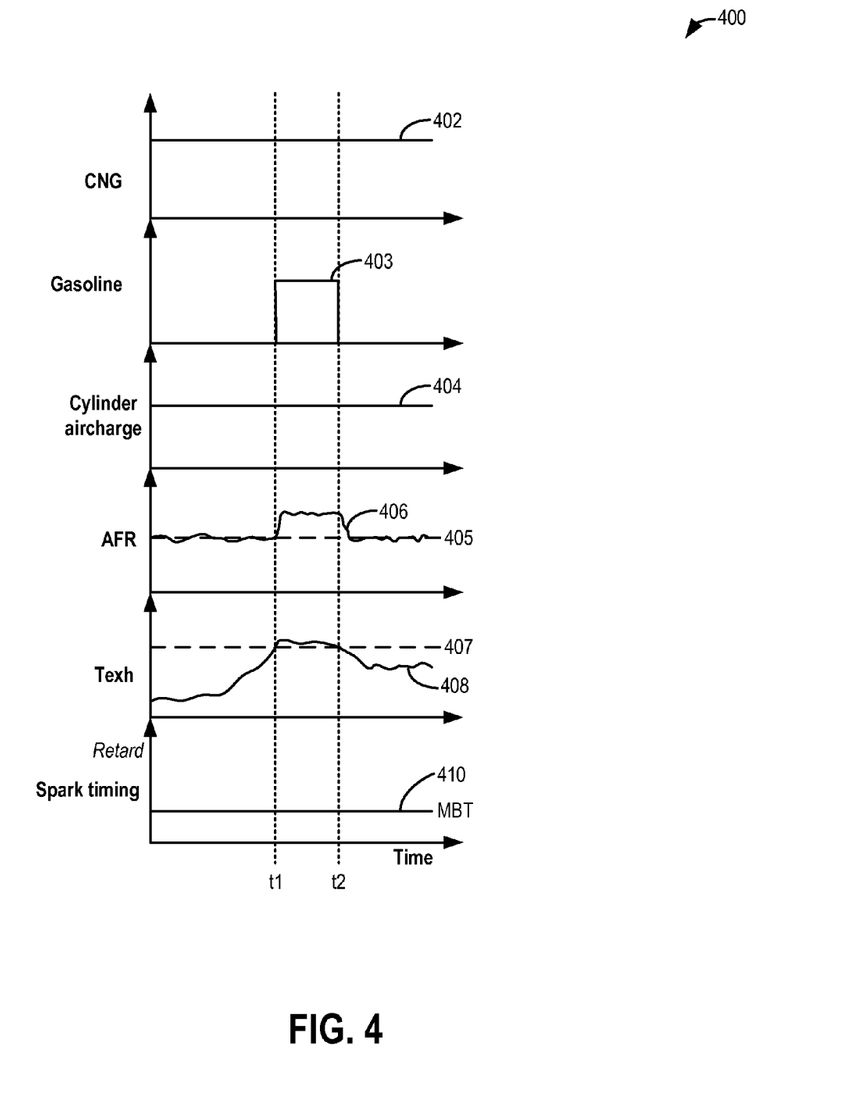

Now turning to FIG. 4, map 400 depicts an example fuel injection adjustment in a multi-fuel engine system responsive to elevated exhaust temperatures. The adjustments include a temporary enrichment of the cylinder by selectively increasing injection of a liquid fuel while maintaining injection of a gaseous fuel to limit exhaust temperatures. The adjustments enable cylinder exhaust cooling without a loss in torque output. Map 400 depicts fueling of a first, gaseous fuel (herein CNG) to a cylinder at plot 402, fueling of a second, liquid fuel (herein gasoline) to the cylinder at plot 403, intake aircharge delivered to the cylinder at plot 404, changes in cylinder combustion air-fuel ratio (AFR) at plot 406, changes in exhaust temperature at plot 408, and changes in spark ignition timing at plot 410.

Prior to t1, the engine may be operating with only a first, gaseous fuel, herein CNG (plot 402), injected into the cylinder to meet engine torque demands. The amount of CNG injected may be adjusted to be proportional to the amount of intake aircharge received in the cylinder (plot 404) so as to operate the cylinder with a combustion air-fuel ratio (plot 406) that is substantially at or around stoichiometry (dashed line 405). For example, an engine controller may port inject a first amount of a first, gaseous fuel (such as CNG) into the engine cylinder, based on the amount of intake air received in the cylinder, to provide a stoichiometric combustion air-fuel ratio. In addition, spark timing may be adjusted to be at peak torque timing or MBT (plot 410).

Between t0 and t1, engine load may increase, and while CNG is used to meet the engine load, an exhaust temperature may gradually increase (plot 408) until at t1, the exhaust temperature is above a threshold temperature 407. In response to elevated exhaust temperatures, while maintaining injection of the first amount of first fuel (herein, CNG), and while maintaining the spark timing at peak torque timing, an engine controller may increase injection of a second, liquid fuel, herein gasoline, to limit exhaust temperatures (plot 403). For example, the controller may direct inject a second amount of gasoline into the cylinder between t1 and t2 to provide a richer than stoichiometry combustion air-fuel ratio. Herein, the second amount of gasoline injected into the cylinder is based on the elevated exhaust temperature, the second amount increased as a difference between the exhaust temperature and threshold temperature 407. It will be appreciated that the amount of first CNG fuel is not adjusted responsive to the elevated exhaust temperature but maintained at an amount that provides a stoichiometric relation with aircharge in the cylinder. Further, only the amount of second gasoline fuel is adjusted responsive to the elevated exhaust temperature with the amount of fuel injected in addition to the first fuel injection amount so as to provide a (net) richer than stoichiometric relation (of total fuel) with aircharge in the cylinder. In other words, the additional enrichment is provided only via the second fuel. By increasing injection of gasoline while maintaining injection of CNG, the gaseous fuel is used to meet the engine power demand while the liquid fuel is used to cool the exhaust. This approach allows exhaust temperatures to be limited without incurring torque losses and without requiring spark retard. In one example, a combination of 100% CNG with 0-15% gasoline may be used while maintaining spark timing at MBT.

Between t1 and t2, the cylinder enrichment via the additional injection of the liquid gasoline fuel is used to cool the exhaust such that at t2, the exhaust temperature is below the threshold temperature 407. Accordingly, at t2, rich injection of gasoline may be stopped, and stoichiometric injection of CNG may be continued. It will be appreciated that while the depicted example shows a constant enrichment profile between t1 and t2, in alternate embodiments, the enrichment profile used between t1 and t2 may be varied based on the change in exhaust temperature. For example, the enrichment profile may be initiated with an amount of second fuel adjusted based on the initial difference between the exhaust temperature and the threshold temperature. Then, as the exhaust cools, the amount of gasoline injected may be gradually decreased as the difference between the exhaust temperature and the threshold temperature gradually decreases. This may result in an enrichment profile that tapers down between t1 and t2.

In some embodiments (not shown), even with the enrichment, exhaust temperatures may not be sufficiently limited. While a controller may continue to increase second fuel injection and consequent cylinder enrichment to limit exhaust heating, after a threshold richer than stoichiometry combustion air-fuel ratio is reached, combustion stability may be affected and no further enrichment may be possible. In those embodiments, after the threshold richer than stoichiometry combustion air-fuel ratio is reached, the controller may maintain injection of the (stoichiometric) first amount of first fuel and (richer than stoichiometry) second amount of second fuel, and address continued elevated exhaust temperatures using throttle adjustments. For example, the controller may reduce intake throttle opening to reduce cylinder air charge. While this reduces exhaust heating, it leads to a temporary torque loss. Consequently, this may be an approach used only after exhausting enrichment options.

In one example, an engine system may include an engine cylinder with a first port injector configured to port inject a first, gaseous fuel into the cylinder, a second direct injector configured to direct inject a second, liquid fuel into the cylinder, and a spark plug for igniting a fuel mixture in the cylinder. A controller with computer readable instructions may be configured to operate the cylinder at stoichiometry by injecting a variable ratio of the first fuel and the second fuel. In response to elevated exhaust temperatures, the controller may enrich the cylinder by selectively increasing injection of the second fuel while maintaining injection of the first fuel and while also maintaining spark ignition timing at MBT, the enrichment based on the elevated exhaust temperature. The enrichment may include increasing a degree of the enrichment as the exhaust temperature exceeds a threshold temperature until a threshold degree of enrichment is reached. Further, an amount of second fuel injected during the enriching may be based on one or more of a flammability limit of the second fuel, an octane rating of the second fuel, and an alcohol content of the second fuel.

Figure 5:
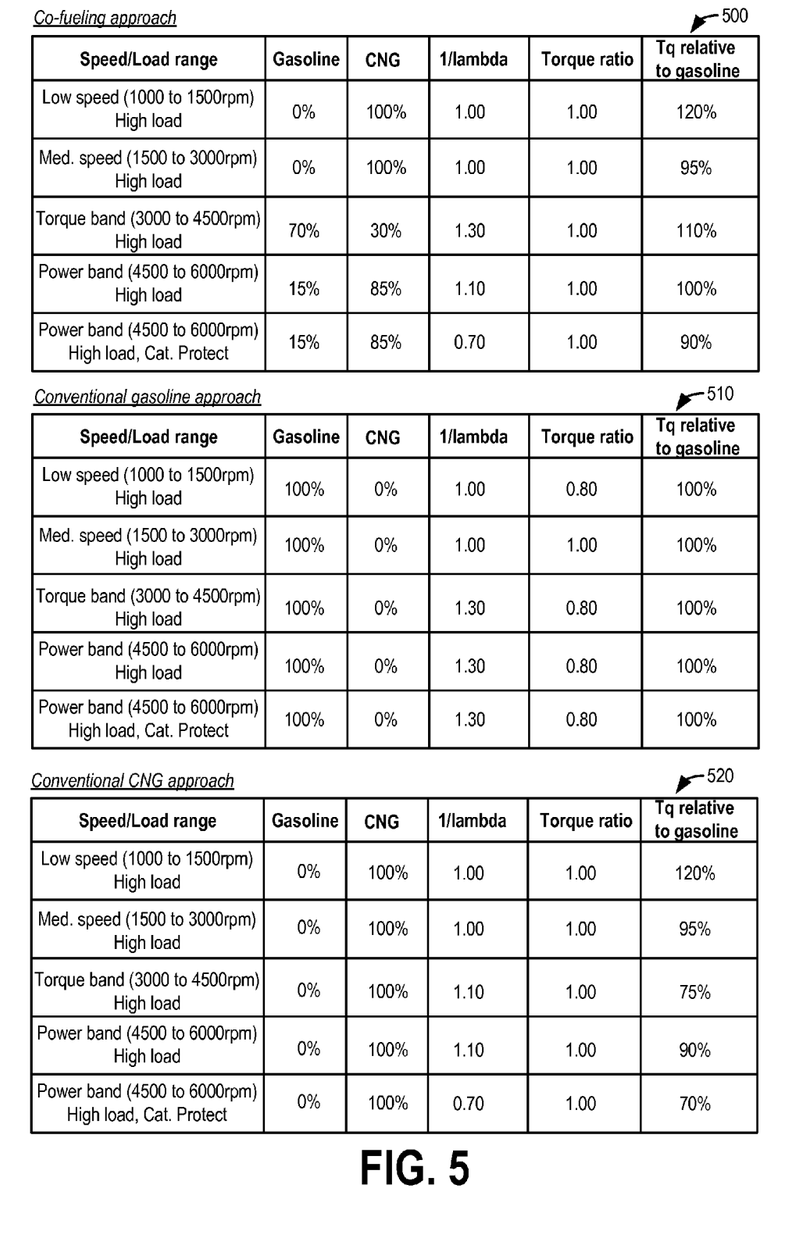
FIG. 5 shows example maps depicting the torque benefits of the co-fueling approach (with CNG and gasoline) at different engine speed-load regions as compared to fueling with only CNG or only gasoline.

Now turning to FIG. 5, torque benefits achieved at different engine speed-load regions through the use of a co-fueling approach, wherein a cylinder is fueled with each of gasoline and CNG (depicted at table 500), is compared to a conventional gasoline only fueling approach (depicted at table 510) as well as a CNG only fueling approach (depicted at table 520).

Each table lists details about engine speed-load regions in the first column. The next two columns depict a fueling approach including a fuel split between gasoline and CNG where the approach includes co-fueling. The fourth column depicts an equivalence ratio (as determined by 1/lambda). The fifth column depicts a torque ratio, which is an indication of spark timing. The last column depicts a torque achieved relative to gasoline only. As such, this is an indication of a torque benefit or torque penalty achieved through the use of the corresponding fueling approach.

As can be seen by comparing tables 500 and 510, during conditions of low engine speed (in the range of 1000-1500 rpm) and high load, while an engine coolant temperature is elevated (e.g., hotter than a threshold temperature) and also while an air charge temperature is elevated (e.g., hotter than a threshold temperature), the conventional gasoline only fueling approach relies on the use of spark retard to achieve exhaust cooling (see torque ratio of 0.8 at table 510 which indicates that spark is retarded to provide 80% of available torque). In comparison, the co-fueling approach enables the same cooling effect to be achieved without the use of spark retard (see torque ratio of 1.0 at table 500 which indicates that spark is substantially at MBT).

During conditions of medium engine speed (in the range of 1500-3000 rpm) and high load, the co-fueling approach is not substantially different from the conventional CNG only fueling approach in addressing exhaust heating.

During conditions of a torque band (where engine speed is in the range of 3000-4500 rpm) and high load, as can be seen by comparing tables 500, 510, and 520, the co-fueling approach provides substantial torque benefits. Specifically, the conventional CNG only fueling approach provides exhaust cooling at the expense of a relatively large torque penalty (see torque output of 75% relative to gasoline at table 520) while the conventional gasoline only fueling approach achieves the same exhaust cooling at the expense of spark retard (see torque ratio of 0.8 at table 510). The co-fueling approach uses a small amount of gasoline to meet the torque deficit while also allowing spark to be maintained at MBT. In addition, the co-fueling approach provides a 110% torque output relative to gasoline only, allowing exhaust cooling to be achieved without affecting engine torque output.

During conditions of a power band (where engine speed is in the range of 4500-6000 rpm) and high load, as can be seen by comparing tables 500, 510, and 520, the co-fueling approach again provides substantial torque benefits. Specifically, the conventional CNG only fueling approach provides exhaust cooling at the expense of running at a rich limit of CNG (10% rich as indicated by equivalence ratio of 1.10 at table 520) while incurring a torque penalty (see torque output of 90% relative to gasoline at table 520). The conventional gasoline only fueling approach achieves the same exhaust cooling at the expense of running 30% rich (see equivalence ratio of 1.30 at table 510) and at the expense of spark retard (see torque ratio of 0.8 at table 510). The co-fueling approach uses a small amount of gasoline at a smaller amount of richness, in addition to the CNG, to restore full power, while maintaining spark at MBT. That is, no torque penalty is incurred with the small gasoline consumption.

During conditions of a power band (where engine speed is in the range of 4500-6000 rpm) and high load, and when the catalyst needs to be protected, as can be seen by comparing tables 500, 510, and 520, the co-fueling approach again provides substantial torque benefits. Specifically, the conventional CNG only fueling approach provides exhaust cooling at the expense of running at a lean limit of CNG (30% lean as indicated by equivalence ratio of 0.70 at table 520) while incurring a torque penalty (see torque output of 70% relative to gasoline at table 520). The conventional gasoline only fueling approach achieves the same exhaust cooling at the expense of running 30% rich (see equivalence ratio of 1.30 at table 510) and at the expense of spark retard (see torque ratio of 0.8 at table 510). The co-fueling approach uses a small amount of gasoline at a smaller amount of richness, in addition to the CNG, to restore full power, while maintaining spark at MBT. That is, no torque penalty is incurred with the small gasoline consumption.

In this way, the attributes of each of a gaseous fuel and a liquid fuel in a multi-fuel engine system may be leveraged. By providing stoichiometric cylinder operating using a gaseous fuel such as CNG while enriching the cylinder using a liquid fuel such as gasoline, exhaust overheating may be addressed without incurring torque losses and without requiring spark retard. By using a combination of the gaseous fuel and the liquid fuel, the flammability limits of the fuels can be widened while also improving knock limits. By taking advantage of the wider flammability limits, combustion stability limits may be increased during the enrichment.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method for an engine, comprising:
during high load conditions, when operating with a first gaseous fuel, in response to an elevated exhaust temperature, enriching the engine via injection of a second, liquid fuel while maintaining spark timing; wherein a larger degree of enrichment with the second liquid fuel is provided based on a widened flammability limit of the second fuel, and the elevated exhaust temperature, and wherein the operating includes combusting a mixture of the first and second fuels via spark ignition in the cylinder.

2. The method of claim 1, wherein the first gaseous fuel is CNG and wherein the second liquid fuel is gasoline or a gasoline-alcohol fuel blend.

3. The method of claim 1, wherein operating with the first gaseous fuel includes adjusting an amount of first fuel injected into a cylinder based on intake air in the cylinder so as to operate the engine with a substantially stoichiometric combustion air-fuel ratio.

4. The method of claim 3, wherein enriching the engine includes maintaining operation with the first gaseous fuel while increasing an amount of the second fuel injected into the cylinder to operate with an overall rich combustion air-fuel ratio, the amount of the second fuel adjusted based on the elevated exhaust temperature.

5. The method of claim 4, wherein the amount of the second fuel injected is further based on an alcohol content of the second fuel.

6. The method of claim 4, wherein the amount of the second fuel injected is further based on the flammability limit of the second fuel.

7. The method of claim 4, further comprising combusting a mixture of the second fuel and the first fuel in the cylinder via spark ignition.

8. The method of claim 4, wherein maintaining operation with the first fuel while increasing the amount of the second fuel injected into the cylinder includes port injecting the first fuel while direct injecting the second fuel into the cylinder.

9. The method of claim 4, wherein the amount of the first fuel is not adjusted responsive to the elevated exhaust temperature and wherein only the amount of the second fuel is adjusted responsive to the elevated exhaust temperature, the adjusting including adjusting the amount of the second fuel based on a difference between the elevated exhaust temperature and a threshold temperature.

10. The method of claim 9, wherein the amount of the second fuel being adjusted based on the elevated exhaust temperature includes, as a difference between the exhaust temperature and the threshold temperature increases, increasing the amount of the second fuel injected into the cylinder while maintaining the amount of the first fuel injected into the cylinder.

11. The method of claim 10, wherein increasing the amount of the second fuel injected into the cylinder includes increasing the amount of the second fuel responsive to the elevated exhaust temperature until the overall rich combustion air-fuel ratio is at a threshold rich combustion air-fuel ratio.

12. The method of claim 11, further comprising, in response to exhaust temperature still being above the threshold temperature after reaching the threshold rich combustion air-fuel ratio, decreasing opening of an intake throttle while maintaining the amount of the first fuel injected to provide the stoichiometric combustion air-fuel ratio and while maintaining the amount of the second fuel to provide the rich combustion air-fuel ratio.

13. The method of claim 1, wherein maintaining spark timing includes maintaining spark timing at peak torque timing or MBT.

14. An engine method, comprising:
port injecting a first amount of a first, gaseous fuel into an engine cylinder to provide a stoichiometric combustion air-fuel ratio; and
in response to elevated exhaust temperatures, while maintaining injection of the first amount of the first fuel, and while maintaining spark timing, direct injecting a second amount of a second, liquid fuel into the cylinder to provide a richer than stoichiometry combustion air-fuel ratio, and combusting a mixture of the first and second fuels via spark ignition in the cylinder; and
in response to reaching a threshold richer than stoichiometry combustion air-fuel ratio, maintaining injection of the first amount of first fuel and the second amount of second fuel, and addressing elevated exhaust temperatures using throttle adjustments.

15. The method of claim 14, wherein the second amount of the second fuel is based on the elevated exhaust temperature, the second amount of the second fuel increased as a difference between the exhaust temperature and a threshold temperature increases until the threshold richer than stoichiometry combustion air-fuel ratio is reached.

16. The method of claim 15, wherein maintaining spark timing includes maintaining spark timing at peak torque timing.

17. An engine system, comprising:
an engine cylinder;
a first port injector configured to port inject a first, gaseous fuel into the cylinder;
a second direct injector configured to direct inject a second, liquid fuel into the cylinder;
a spark plug for igniting a fuel mixture in the cylinder; and
a controller with computer readable instructions for:
operating the cylinder at stoichiometry by injecting a variable ratio of the first fuel and the second fuel; and
in response to elevated exhaust temperatures, enriching the cylinder by selectively increasing injection of the second fuel while maintaining injection of the first fuel and while also maintaining spark ignition timing at MBT, a larger enrichment provided based on a widened flammability limit of the second fuel and the elevated exhaust temperature and wherein the operating includes combusting a mixture of the first and second fuels via spark ignition in the cylinder.

18. The system of claim 17, wherein the larger enrichment based on the elevated exhaust temperature includes increasing a degree of the enrichment as the exhaust temperature exceeds a threshold temperature until a threshold degree of enrichment is reached.

19. The system of claim 18, wherein an amount of the second fuel injected during the enriching is based on one or more of a flammability limit of the second fuel, an octane rating of the second fuel, and an alcohol content of the second fuel.

\* \* \* \* \*